United States Patent [19]

Murakami

[11] Patent Number: 4,767,348
[45] Date of Patent: Aug. 30, 1988

[54] EXTERNAL MEMORY PACK HAVING AN OPENING AND A SLIDEABLE SHUTTER

[75] Inventor: Osamu Murakami, Yokohama, Japan

[73] Assignee: Canon Kabushiki Kaisha, Tokyo, Japan

[21] Appl. No.: 912,666

[22] Filed: Sep. 29, 1986

Related U.S. Application Data

[63] Continuation of Ser. No. 704,921, Feb. 25, 1985, abandoned.

[30] Foreign Application Priority Data

Feb. 28, 1984 [JP] Japan ................................ 59-35202

[51] Int. Cl.4 .................... H01R 13/453; H01R 23/70
[52] U.S. Cl. ..................................... 439/140; 439/267
[58] Field of Search ................. 339/17 L, 17 LC, 36, 339/39–43; 361/399; 220/345, 346, 348; 206/387, 389, 444; 360/97, 133; 439/140, 260, 267

[56] References Cited

U.S. PATENT DOCUMENTS 2,296,631  9/1942  Doane .................................. 339/259
3,188,598  6/1965  Pferd .................................. 339/17 L
3,200,361  8/1965  Schwartz et al. ................... 361/399
3,988,755 10/1976  Vogel .................................... 339/40
4,119,813 10/1978  Sato ..................................... 339/40
4,138,711  2/1979  Bremenour et al. ............... 361/399
4,352,492 10/1982  Smith ................................. 361/399
4,397,511  8/1983  Clark et al. ..................... 339/17 LC
4,511,944  4/1985  Saito ................................... 360/133
4,514,024  4/1985  Clark .................................... 339/40

FOREIGN PATENT DOCUMENTS 77566  4/1983  European Pat. Off. ............ 206/387
2490413  3/1982  France ................................ 339/41

Primary Examiner—Neil Abrams
Attorney, Agent, or Firm—Fitzpatrick, Cella, Harper & Scinto

[57] ABSTRACT

An external memory pack has a circuit board having an electrical contact, a case for covering the circuit board, an opening formed in the case to expose the electrical contact of the circuit board, a slidable shutter for opening and closing the opening and an actuator for actuating the shutter for sliding.

7 Claims, 4 Drawing Sheets

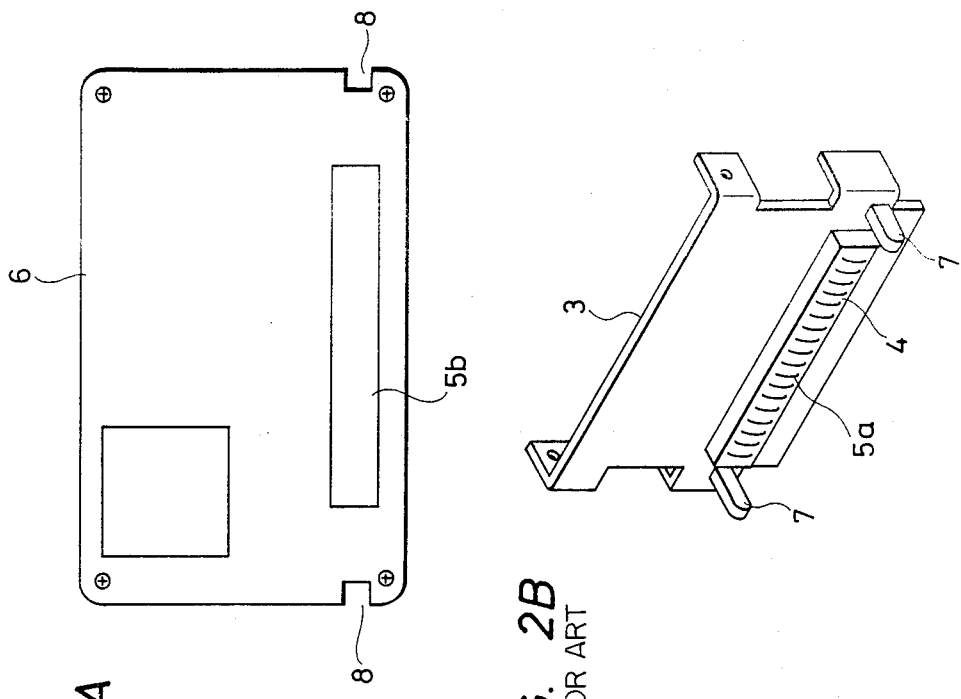
FIG. 2A
PRIOR ART
FIG. 2B
PRIOR ART
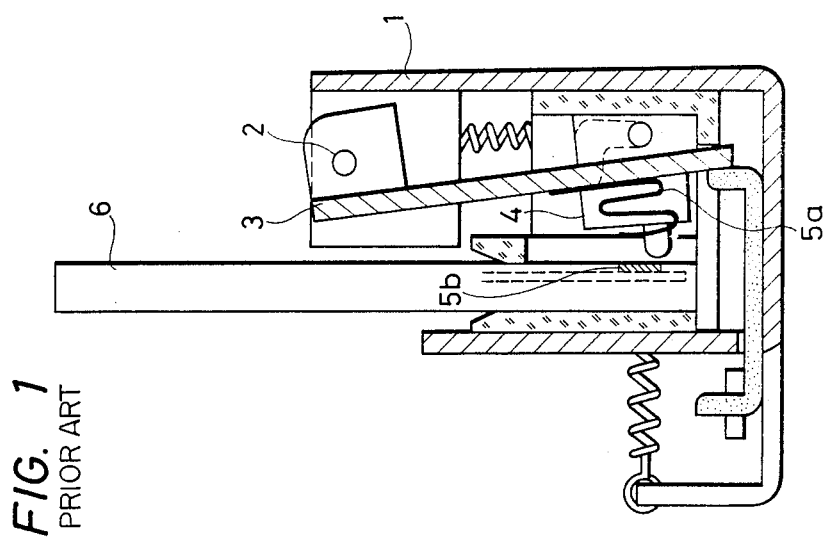
FIG. 1
PRIOR ART

EXTERNAL MEMORY PACK HAVING AN OPENING AND A SLIDEABLE SHUTTER

This application is a continuation of application Ser. No. 704,921, filed Feb. 25, 1985, now abandoned.

BACKGROUND OF THE INVENTION

1. Field of the Invention

The present invention relates to an external memory pack which is plugably, mechanically and electrically coupled to an electronic equipment.

2. Description of the Prior Art

FIG. 1 shows a prior art connector mechanism 1 of an electronic equipment which allows mechanical and electrical connection of a memory pack to the electronic equipment by the insertion of the memory pack into an opening formed on a front panel of the electronic equipment. As the memory pack 6 is inserted, a connector 4 having connecting terminals 5a mounted on a connector support 3 which makes a pendulum motion around a pin approaches the memory pack 6 and when the memory pack 6 is pushed down to its lowest position, the connecting terminals 5a of the connector 4 contact to connecting terminals 5b of the memory pack 6 so that they are electrically contacted. The memory pack 6 has recesses 8 (FIG. 2A) which projections 7 (FIG. 2B) formed on the connector support 3 engage to prevent the disconnection of the inserted memory pack 6.

In the prior art memory pack adapted to be connected to the electrical equipment, the recesses 8 which the projections 7 of the connector support 3 engage to prevent disconnection are required. This impairs external design. Further, since connecting terminals 5b which contact the connecting terminals 5a of the connector 4 are usually exposed to the outer plane of the memory pack 6, the connecting terminals 5b are apt to be scratched or contaminated, which leads to miscontact. In order to overcome the above problem, it has been proposed to cover the connecting terminals 5b by a slidable shield plate. However, since the plate is manually slid, the handling is troublesome.

SUMMARY OF THE INVENTION

It is an object of the present invention to provide an external memory pack which positively prevents disconnection of the pack and miscontact due to scratching and contamination of connecting terminals and which does not impair external design.

It is another object of the present invention to provide an external memory pack in which a substrate having electrical contacts mounted thereon is covered with a cover member having an opening, and a shutter for the opening is provided with biasing means.

It is another object of the present invention to provide an external memory pack in which a shutter having an opening is moved as the external memory pack is loaded.

It is another object of the present invention to provide an external memory pack in which the external memory pack is locked by a hole formed therein as the external memory pack is loaded, the hole and contacts of the external memory pack are covered by a shutter which is moved as the external memory pack is loaded and the shutter is locked by the hole and the contacts are connected.

It is another object of the present invention to provide an external memory pack in which actuation means for a shutter which prevents exposure of electrical contacts serves to electrically connect a substrate to an outer case.

It is another object of the present invention to provide a connector which receives a member having contacts covered by a shutter.

BRIEF DESCRIPTION OF THE DRAWINGS

FIG. 1 is a sectional view of a connector mechanism for connecting a prior art memory pack, FIG. 2A shows an external view of the prior art memory pack, FIG. 2B shows an external view of a connector support of the connector mechanism shown in FIG. 1.

DETAILED DESCRIPTION OF THE PREFERRED EMBODIMENTS

Figure 3:
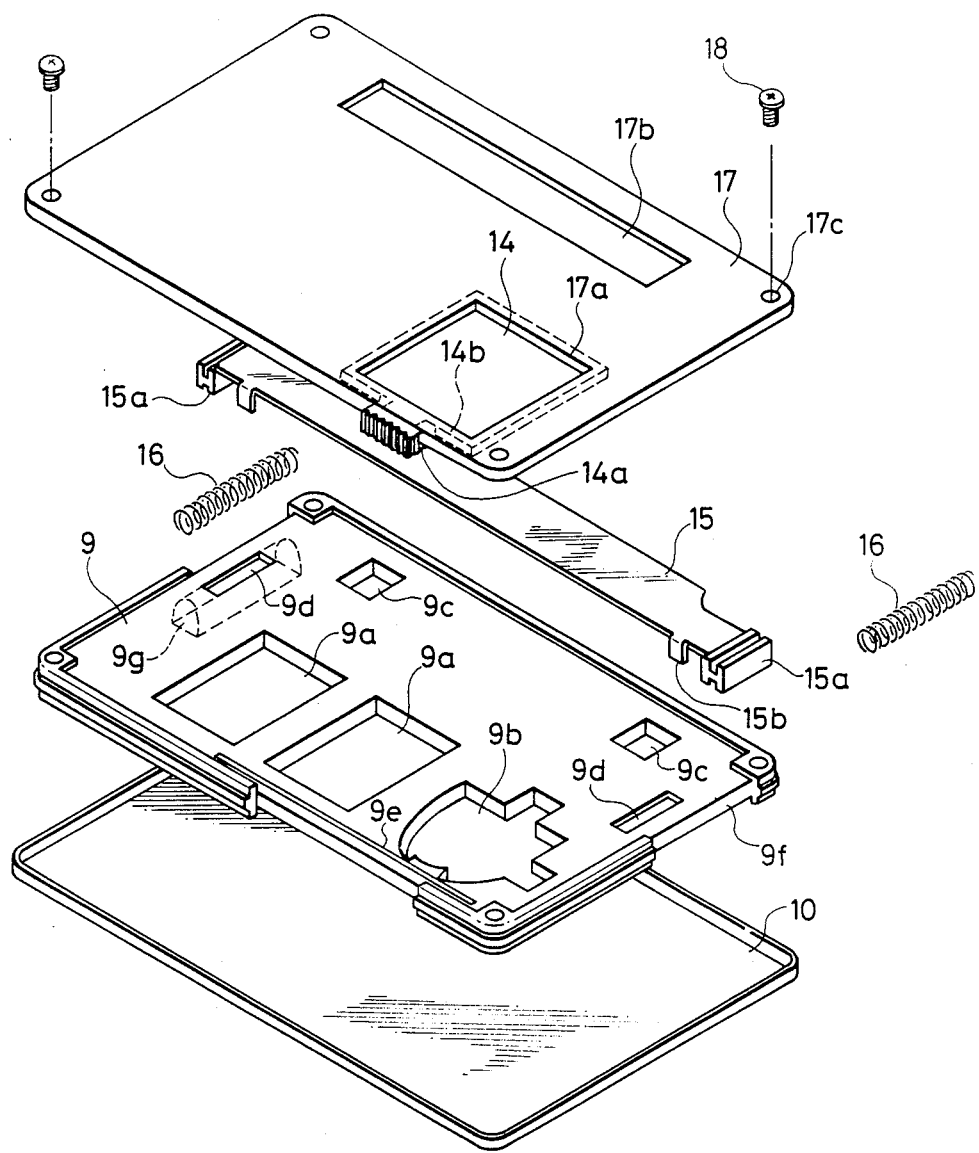
FIG. 3 is a developed perspective view of a memory pack of an embodiment in accordance with the present invention.
Figure 4:
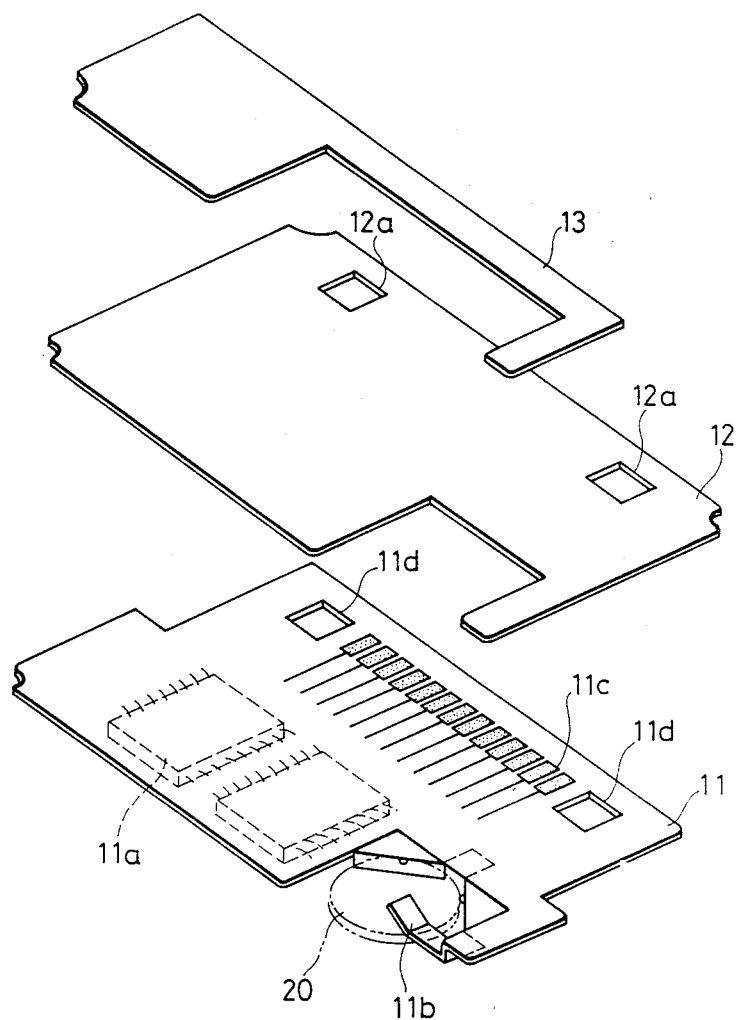
FIG. 4 is a perspective view of a printed circuit board, an insulation plate and a spacer mounted in the memory pack.

FIGS. 3 and 4 show one embodiment of the memory pack of the present invention. FIG. 3 is a developed perspective view of the memory pack. Numeral 9 denotes a frame which is molded by plastic resin and has openings 9a for receiving electronic parts such as a ROM (read-only memory) and a RAM (random access memory) mounted on a printed circuit board 11, an opening 9b in which a battery 20 is mounted, holes 9c into which anti-disconnection projections 7 formed on the connector support 3 of the connector mechanism 1 shown in FIG. 1 are inserted and holes 9d into which bent portions 15b of a shutter plate 15 are inserted. Numeral 10 denotes a lower case made of a metal plate which serves to reinforce the memory pack and which is attached to the frame 9 in union by boarding.

In FIG. 4, numeral 11 denotes the printed circuit board to be mounted on the frame 9, electronic parts 11a and battery contacts 11b are soldered to the surface of the printed circuit board 11 facing the frame 9, and connecting terminal pattern 11c to the connected to connecting terminals 5a of the connector 4 of the connector mechanism are formed on the other surface. Holes 11d corresponding to the holes 9c of the frame 9 are formed in the board 11. Numeral 12 denotes an insulation board having substantially the same contour as that of the printed circuit board 11, to be arranged on the printed circuit board 11, and numeral 13 denotes a spacer which is arranged on the insulation board 12 to secure a space in which shutter plate 15 can move. Holes 12a corresponding to the holes 9c of the frame 9 are formed in the insulation board 12.

Numeral 14 denotes a battery cover made by folding a metal plate and has a knob 14a formed at one end thereof by outsert molding to allow external manipulation. The battery cover 14 can be moved within the frame 9 without inclination when the knob 14a is moved such that a folded portion 14b at one edge is guided along a groove 9e formed in the frame 9. Numeral 15 denotes a shutter plate for protecting the connecting terminal pattern 11c on the printed circuit board 11. It is manufactured by folding a metal plate like the battery cover 14. Knobs 15a are formed at the opposite ends of the shutter plate 15 by outsert molding so that they protrude from the sides of the frame 9 to allow external manipulation. The shutter plate 15 is guided by the knobs 15a and guide 9f on the side of the frame 9 and are movable in the frame 9 within a range determined by the length of the hole 9d. Numeral 16 denotes a spring which is accommodated in a case 9g formed under the hole 9d and held between the frame 9 and the lower case 10. A bent portion 15b at one end of the shutter plate 15 engages or abuts one end of the spring 16 accommodated in the case 9g through the hole 9d formed above the case 9g. Thus, the shutter plate 15 is always urged to the hole 9c by the biasing force of the spring 16.

Numeral 17 denotes a decoration plate made of a metal plate which serves as a surface member of the memory pack. It has an opening 17a for exchanging the battery, a hole 17b through which the connecting terminal pattern 11c is exposed and bolt holes 17c. Accordingly, the memory pack is assembled by sequentially stacking the frame 9, printed circuit board 11, insulation board 12, spacer 13, battery cover 14, shutter plate 15 and decoration plate 17, and finally bolting the decoration plate 17 to the frame 9 by the bolts 18. The lower case 10 and the springs 16 may be mounted before or after the bolting step.

Figure 5A:
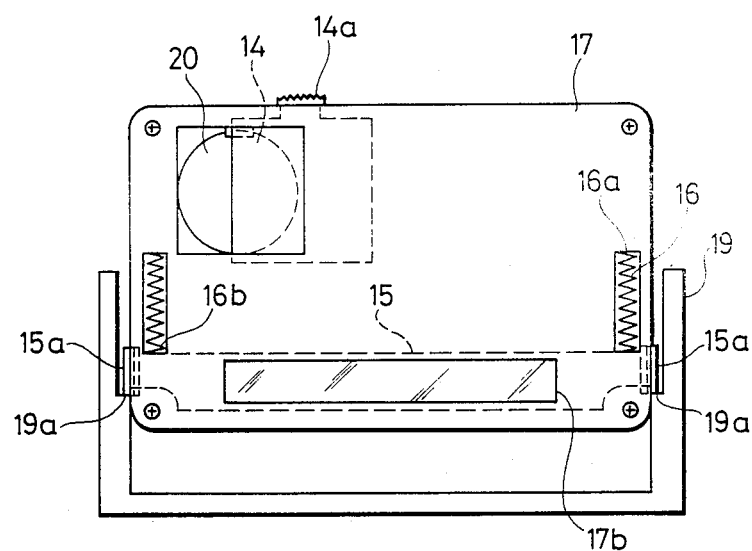
FIGS. 5A and 5B show operations of the memory pack in the present embodiment.
Figure 5B:
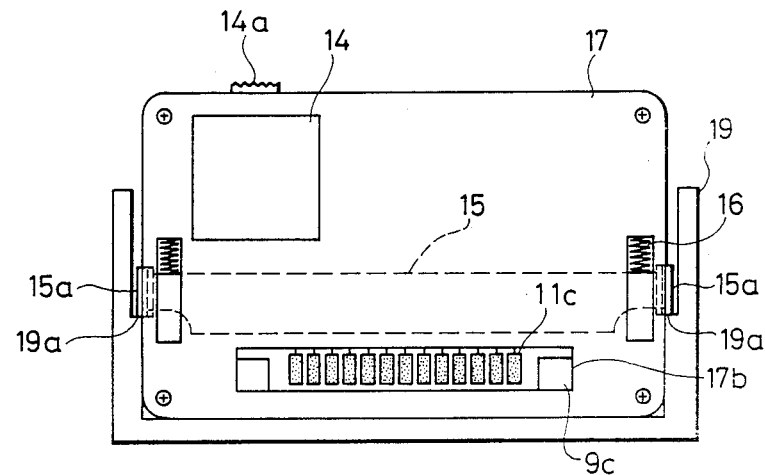

Referring to FIGS. 5A and 5B, the operation of the memory pack thus constructed is explained. When the memory pack is not in use, the shutter plate 15 closes the exposing hole 17b for the connecting terminal pattern 11c of the decoration plate 17c to protect the connecting terminal pattern 11c from the outside. FIG. 5A shows a position immediately before the shutter plate 15 is opened as the memory pack is inserted into the connector mechanism 1 of the electronic equipment. The springs 16 of the frame 9 each have one end 16a held by the case 9g of the frame 9 and the other end 16b held by the bent portion 15b of the shutter plate 15. Numeral 19 denotes a memory pack holder of the connector mechanism 1 shown in FIG. 1, which is provided in the electronic equipment to which the memory pack is loaded. It holds the memory pack in a space between the opposite sides thereof. The memory pack holder 19 has steps 19a against which the knobs 15a at the opposite ends of the shutter plate 15 projecting from the opposite sides of the memory pack, abut. FIG. 5A shows the position at which the knobs 15a abut against the steps 19a.

As the memory pack is further inserted into the holder 19 from the position shown in FIG. 5A, the downward movement of the knobs 15a, is blocked by the steps 19a, the springs 16 are compressed, the shutter plate 15 is slid upward relative to the memory pack, and the connecting terminal pattern 11c and the holes 9c on both sides of the pattern 11c are gradually exposed. When the memory pack is inserted to its lowest position as shown in FIG. 5B, the connecting terminal pattern 11c is completely exposed through the opening 17b of the decoration plate 17. The springs 16 are compressed by the shutter plate 15 as shown in FIG. 5B. Thus, the holes 9c formed in the frame 9 are exposed through the connecting terminal exposing opening 17b of the decoration plate 17, and the projections 7 formed on the connector support 3 of the connector mechanism 1 are fitted to the holes 9c through the opening 17b so that the memory pack is locked in place. The connecting terminals 5a of the connector support 3 are press-contacted to the connecting terminal pattern 11c of the memory pack.

Because the projections 7 abut against the edges of the holes 9c of the frame 9 or the connecting terminal exposing opening 17b of the decoration plate 17 and serve as a stopper, the disconnection of the memory pack is positively prevented. Thus, the memory pack is electrically and mechanically connected. When the memory pack is to be unloaded, the connector support 3 is retracted to remove the projections 7 from the holes 9c and the opening 17b. When the memory pack is unloaded, the shutter plate 15 is pushed down by the restoring force of the springs 16, and the opening 17b of the decoration plate and the holes 9c of the frame 9 are again covered by the shutter plate 15.

As described hereinabove, in accordance with the memory pack of the present invention, the disconnection of the memory pack is positively prevented and the anti-disconnection holes 9c and the connecting terminal pattern 11c are covered by the shutter plate 15 so that the memory pack presents an excellent external appearance. Since the connecting terminal pattern 11c is covered by the shutter 15, scratching and the contamination of the connecting terminal pattern 11c are prevented and miscontact is prevented. In the prior art memory pack having the shutter for covering the connecting terminals, the shutter is manually operated and the handling thereof is troublesome. In the present embodiment, the shutter plate 15 is automatically opened and closed as the memory pack is loaded and unloaded. Therefore, the handling is very easy.

Figure 6:
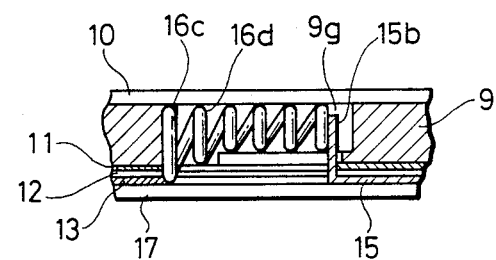
FIG. 6 is a sectional view of another embodiment of the present invention.

FIG. 6 shows another embodiment of the present invention. It shows a sectional view in a vicinity of the spring 16 for opening and closing the shutter plate 15. Portions 16c and 16d of the spring 16 have a larger diameter than the rest of the spring 16, and diametric resiliency of the spring is utilized to ground the decoration plate 17, the lower case and the printed circuit board 11 of the memory pack. Since no separate grounding member is required, the number of parts and the number of assembling steps can be reduced and the cost is reduced.

In accordance with the present invention, accidental disconnection of the memory pack after the loading is prevented and the miscontact due to the scratch and the contamination of the connecting terminals is prevented and the external design of the memory pack is not impaired. The cover plate for the connecting terminals is automatically opened and closed as the memory pack is loaded and unloaded and hence the handling of the memory pack is easy.

What is claimed is:

1. In combination, an external memory pack and a connector, said external memory pack being detachably loaded into said connector and comprising:
    a circuit board having a plurality of electrical contacts adapted to deliver and receive a signal to and from an electronic equipment body and having a hole formed therein for receiving a latch pin of said connector for latching said external memory pack to said connector;
    case means for covering said circuit board and having an opening for exposing all of said electrical contacts and said hole of said circuit board; and
    shutter means mounted between said circuit board and a wall of said case means so as to be slidable, relative to said case means, in the direction in which said case means is loaded into said connector to open and close said opening and having a projection which projects from said case means for slidably moving said shutter.

2. A combination according to claim 1, said connector further comprising a second contact for press-contacting said exposed electrical contact when said external pack is loaded into said connector.

3. An external pack comprising:
a circuit board having an electrical contact;
conductive case means for covering said board and having an opening for exposing said electrical contact;
shutter means for opening and closing said opening of said case means; and
actuation means for actuating said shutter means so as to close said opening, said actuating means being a coil spring in contact with said board and said case in a diametric direction of the coil spring and always electrically connecting said board to said case therethrough.

4. An external pack according to claim 1, wherein said shutter means is actuated by said actuation means in a predetermined direction to close said opening.

5. An external pack according to claim 1, wherein said actuation means comprises a coiled spring having portions of different diameters.

6. In combination, an external memory pack and a connector, said external memory pack being detachably loaded into said connector and comprising:
a circuit board having a plurality of electrical contacts adapted to deliver and receive a signal to and from an electronic equipment body and having a hole formed therein for attaching said external memory pack to said connector;
case means for covering said board and having an opening for exposing all of said electrical contacts and said hole of said board;
shutter means mounted between said board and said case means so as to be slidable, relative to said case means, in a substantially straight line direction to open and close said opening, said shutter means having a projection which projects from said case means;
engaging means formed in said connector for abutting against the projection of said shutter so that when said external memory pack is attached to said connector, said engaging means cooperates with the projection to cause said shutter means to slide, relative to said case means, and thus open said opening; and
second engaging means on said connector for engaging with said hole to cause said external memory pack to become attached to said connector, and electrical connector means on said connector for making electrical connection to said electrical contact when said external memory pack is attached to said connector.

7. A combination according to claim 1, wherein said electrical connector means comprises a second contact that is press-contacted to said exposed electrical contact when said memory pack is latched to said connector.

* * * * *

UNITED STATES PATENT AND TRADEMARK OFFICE
CERTIFICATE OF CORRECTION

PATENT NO. : 4,767,348
DATED : August 30, 1988
INVENTOR(S) : Osamu Murakami

It is certified that error appears in the above-identified patent and that said Letters Patent is hereby corrected as shown below:

COLUMN 2

Line 49, change "the" to --be--.

COLUMN 3

Line 53, change "15a," to --15a--.

COLUMN 5

Line 22, change "claim 1," to --claim 3,--; and

Line 25, change "claim 1," to --claim 3,--.

COLUMN 6

Line 28, change "claim 1," to --claim 6,--.

Signed and Sealed this

Twentieth Day of June, 1989

Attest:

DONALD J. QUIGG

Attesting Officer

Commissioner of Patents and Trademarks